(12) United States Patent
Hanay et al.

(10) Patent No.: US 10,771,967 B2
(45) Date of Patent: *Sep. 8, 2020

(54) ELECTRONIC DEVICE CREDENTIAL MANAGEMENT

(71) Applicant: Extreme Networks, Inc., San Jose, CA (US)

(72) Inventors: John William Hanay, Palo Alto, CA (US); Daniel Estevan O'Rorke, Sunnyvale, CA (US); Ravi Mishra, Sunnyvale, CA (US); Young Yoon, Alameda, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,581

(22) Filed: Feb. 26, 2019

(65) Prior Publication Data

US 2019/0200219 A1 Jun. 27, 2019

Related U.S. Application Data

(63) Continuation of application No. 15/073,503, filed on Mar. 17, 2016, now Pat. No. 10,219,151.

(51) Int. Cl.
*H04W 12/04* (2009.01)
*H04W 12/06* (2009.01)

(52) U.S. Cl.
CPC .......... *H04W 12/04* (2013.01); *H04W 12/06* (2013.01)

(58) Field of Classification Search
CPC ....... H04W 12/04; H04W 12/06; G06F 21/31; H04L 2209/60; H04L 2209/80; H04L 2463/082; H04L 63/062; H04L 63/08; H04L 63/0823; H04L 63/0838; H04L 63/126; H04L 9/083; H04L 9/3226
See application file for complete search history.

(56) References Cited

U.S. PATENT DOCUMENTS

2015/0082025 A1* 3/2015 Deshpande ........... H04L 9/0847
713/155
2016/0330079 A1* 11/2016 Laos ....................... H04L 41/12

* cited by examiner

*Primary Examiner* — Abiy Getachew
(74) *Attorney, Agent, or Firm* — Sterne, Kessler, Goldstein & Fox P.L.L.C.

(57) ABSTRACT

A unique pre-shared key plug-in is installed on a Chromebook device. Identification data associated with the Chromebook device is received, from the unique pre-shared key plug-in through a Chromebook client management system API. A unique pre-shared key is assigned to the Chromebook device using the identification data. The unique pre-shared key is sent to the Chromebook device. The Chromebook device is configured to seamlessly authenticate for a wireless network using the unique pre-shared key.

20 Claims, 7 Drawing Sheets

ELECTRONIC DEVICE CREDENTIAL MANAGEMENT

CROSS-REFERENCE TO RELATED APPLICATIONS

This application is a continuation of U.S. patent application Ser. No. 15/073,503, filed Mar. 17, 2016, now U.S. Pat. No. 10,219,151, which is incorporated by reference herein.

BACKGROUND

An area of ongoing research and development is the use of devices of the same type for organizations. In particular, Chromebook devices have become extremely popular in organizations, such as schools As Chromebook device popularity has risen here exists a need for managing Chromebook device access to wireless networks.

The foregoing examples of the related art and limitations related therewith are intended to be illustrative and not exclusive. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, a unique pre-shared key plug-in is installed on a Chromebook device. Further, in various implementations, identification data associated with the Chromebook device is received, from the unique pre-shared key plug-in through a Chromebook client management system API. In various embodiments, a unique pre-shared key is assigned to the Chromebook device using the identification data. Additionally, in various embodiments, the unique pre-shared key is sent to the Chromebook device. In various embodiments, the Chromebook device is configured to seamlessly authenticate for a wireless network using the unique pre-shared key.

These and other advantages will become apparent to those skilled in the relevant art upon a reading of the following descriptions and a study of the several examples of the drawings.

BRIEF DESCRIPTION OF THE DRAWINGS

FIG. 5 depicts a flowchart of an example of a method for onboarding a Chromebook device for accessing a wireless network using a Chromebook unique pre-shared key plug-in.

FIG. 6 depicts a flowchart of an example of a method for authenticating a Chromecast device to access a wireless network using a Chromebook unique pre-shared key plug-in.

DETAILED DESCRIPTION

Figure 1:
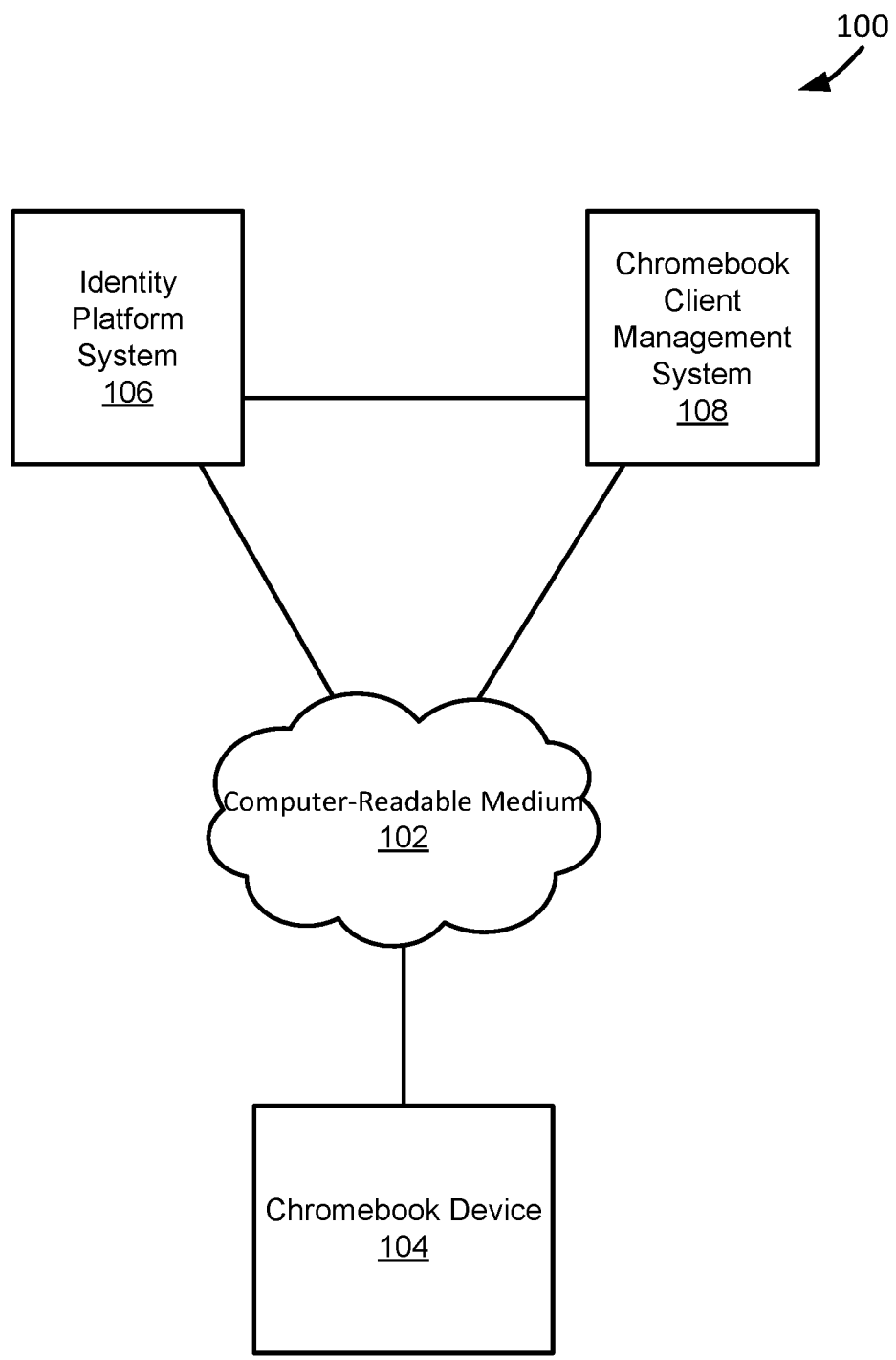
FIG. 1 depicts a diagram of a system for managing Chromebook devices access to a network.

FIG. 1 depicts a diagram 100 of a system for managing Chromebook devices access to a network. The example system shown in FIG. 1 includes a computer-readable medium 102, a Chromebook device 104, an identity platform system 106, and a Chromebook client management system 108.

In the example system shown in FIG. 1, the Chromebook device 104, the identity platform system 106, and the Chromebook client management system 108 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the Chromebook device 104, the identity platform system 106, and the Chromebook client management system 108, and other applicable systems or devices described in this paper can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some implementations, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The Chromebook device 104 functions according to an applicable device for sending and receiving data through a network and running Chrome OS. In various implementations, the Chromebook device 104 can include a communication engine configured to use a key for authenticating the Chromebook device 104 for communicating with a network. Depending upon implementation-specific or other considerations, the Chromebook device 104 uses a unique pre-shared key for authenticating for a network. As used in this paper a unique pre-shared key is a private key used for authenticating a client device for a network uniquely associated with the client device, a plurality of client devices including the client device, a user of the client device, or a plurality of users of the client devices. For example, MAC addresses of a client device or a plurality of client devices and/or usernames of a user or a plurality of users can be bound to a unique pre-shared key to associate the client device, the plurality of client devices, the user, or the plurality of users with the unique pre-shared key. In various implementations, the Chromebook device 104 is assigned to and uniquely associated with a user. For example, the Chromebook device 104 can be a client device assigned to a student in a class.

In a specific implementation, the Chromebook device 104 acts as or includes a station, by including a wireless interface through which it can be coupled through a Wi-Fi connection to a network device. A station, as used in this paper, can be referred to as a device with a media access control (MAC) address and a physical layer (PHY) interface to a wireless medium that complies with the IEEE 802.11 standard. Thus, for example, the Chromebook device 104 can be referred to as a station, if applicable. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

In a specific implementation, the Chromebook device 104 is wirelessly coupled to a network or a plurality of networks through one or a plurality of network devices. Network devices function according to applicable devices for routing, at least in part, data traffic to and from a backend of a network. Depending upon implementation-specific or other considerations, network devices can be routers, switches, access points, gateways, including wireless gateways, repeaters, or any combinations thereof. In functioning as gateways, network devices can transport data from a backend of a network to a device coupled to the network devices. In functioning as access points, network devices can couple a device coupled to the network devices to a network associated with the network devices. Network devices can function according to applicable protocols for forming part of a wireless network, including Wi-Fi, such as the IEEE 802.11 standards, which are hereby incorporated by reference.

The identity platform system 106 functions to manage credentials of client devices for accessing a wireless network, thereby serving as an active directory. The identity platform system 106 can manage credential for Chromebook devices/client devices for accessing a wireless network. In various implementations, the identity platform system 106 can generate and/or update unique pre-shared key associated device data indicating device credentials for authenticating client devices. Unique pre-shared key associated device data can include identifications of client devices, unique pre-shared keys associated with client devices or users of the device, and identifications of users who operate the client devices or are associated with the unique pre-shared keys. Depending upon implementation-specific or other considerations, the identity platform system 106 can associate and disassociate unique pre-shared keys with client devices. For example, if a student is assigned a new Chromebook device, then the identity platform system 106 can disassociate a unique pre-shared key associated with the Chromebook device associated with the student. Further in the example, if the Chromebook device is given to another employee, the identity platform system 106 can associate another unique pre-shared key with the Chromebook device. Further depending upon implementation-specific or other considerations, the identity platform system 106 can disassociate and associate different users with Chromebook devices. For example, if a student is moved to another class, then the identity platform system 106 can disassociate the student from a Chromebook device assigned to the student and associate a new student with the device. In various implementations, the identity platform system 106 manages credentials of Chromebook devices according to input from a network administrator.

In a specific implementation, the identity platform system 106 manages authentication of Chromebook devices for accessing a network. In various implementations, the identity platform system 106 can authenticate a Chromebook device for accessing a network using a unique pre-shared key assigned to the Chromebook device. For example, the identity platform system 106 can receive authentication data from a Chromebook device generated using a unique pre-shared key and determine from the authentication data whether it was generated using a unique pre-shared key uniquely associated with the Chromebook device. The identity platform system 106 can be implemented as part of a network device or implemented as a cloud based system accessible by the network device.

In a specific implementation, the identity platform system 106 functions to onboard a Chromebook device for accessing a wireless network. In onboarding a Chromebook device, the identity platform system 106 can assign a unique pre-shared key to the device for authenticating the device for a network. Further, in onboarding a Chromebook device, the identity platform system 106 can associate an identification of the Chromebook device and/or an identification of a user of the Chromebook device with the unique pre-shared key. For example, once a Chromebook device attempts to access a wireless network, the identity platform system 106 can associate a unique pre-shared key to the device, for use in authenticating the device for a network. Further in the example, the identity platform system 106 can provide the unique pre-shared key assigned to the device for sending to the device and for future use in authenticating the device for the network. Depending upon implementation-specific or other considerations, the identity platform system 106 can provide a service set identification (hereinafter referred to as "SSID") for use in authenticating a device for a network.

In a specific implementation, the identity platform system 106 includes an administrator interface. An administrator interface functions according to an applicable interface through which an administrator can communicate with the identity platform system 106. Depending upon implementation-specific or other considerations, through an administrator interface, an administrator can instruct the identity platform system 106 or an applicable system for communicating with Chromebook devices, such as the Chromebook client management systems described in this paper, to push data to Chromebook devices. For example, an administrator can instruct the identity platform system 106 to push a Chromebook unique pre-shared key plug-in to be downloaded to specific Chromebook devices. Further depending upon implementation-specific or other considerations, through an administrator interface, an administrator can provide instructions to the identity platform system 106. For example, if a Chromebook device has been lost, an administrator can instruct the identity platform system 108 to disassociate the Chromebook device from a unique pre-shared key assigned to the device.

The Chromebook client management system 108 functions to send and receive data to and from a Chromebook device for use in onboarding and authenticating the Chromebook device to access a wireless network. The Chromebook client management system 108 can be implemented in part through a Chromebook unique pre-shared key plug-in residing on a Chromebook device. Depending upon implementation-specific or other considerations, the Chromebook client management system 108 can communicate with an applicable system for onboarding and authenticating a client device, such as the identity platform systems described in this paper, as part of onboarding and authenticating a Chromebook device. For example, the Chromebook client management system 108 can receive a unique pre-shared key assigned to a Chromebook device and/or an SSID, for use in providing the Chromebook device access to a wireless network. Further depending upon implementation-specific or other considerations, the Chromebook client management system 108 can use an applicable application program interface (hereinafter "API") to communicate with an applicable for onboarding and authenticating a Chromebook device, such as the identity platform systems described in this paper. For example, the Chromebook client management system 108 can send an identification of a Chromebook device, for use in onboarding the Chromebook device, using an API.

In a specific implementation, the Chromebook client management system 108 can determine an identification of a Chromebook device and/or a user, e.g. username, of the Chromebook device, and provide the identification(s) to an applicable system for onboarding and authenticating the Chromebook device using the identification(s), such as the identity platform systems described in this paper. For example, the Chromebook client management system 108 can provide a MAC address of a Chromebook device attempting to onboard for accessing a wireless network to an applicable system for onboarding and authenticating the Chromebook device, such as the identity platform systems described in this paper. Identifications of either or both a Chromebook device or a user of the Chromebook device, provided by the Chromebook client management system 108 can be used to assign a unique pre-shared key to the Chromebook device, as part of onboarding the Chromebook device. For example, unique pre-shared key associated device data can be updated to indicate a MAC address of a Chromebook device and a unique pre-shared key assigned to the device, thereby uniquely associating the Chromebook device with the specific pre-shared key.

In a specific implementation, the Chromebook client management system 108 functions to configure a Chromebook device to access a wireless network. Depending upon implementation-specific or other considerations, in configuring a Chromebook device to access a wireless network, the Chromebook client management system 108 can provide to the Chromebook a unique pre-shared key assigned to the Chromebook. Further depending upon implementation-specific or other considerations, in configuring a Chromebook device to access a wireless network, the Chromebook client management system 108 can configure the Chromebook device to use a unique pre-shared key assigned to the Chromebook device for authenticating to access a wireless network. In various implementations, the Chromebook client management system 108 can seamlessly configure a Chromebook device to access a wireless network with little to no knowledge of a user of the Chromebook device. For example, the Chromebook client management system 108 can provide a unique pre-shared key to a Chromebook device and configure the Chromebook device to authenticate for accessing a wireless network using the unique pre-shared key in a manner agnostic to a user of the Chromebook device.

In a specific implementation, the Chromebook client management system 108 can onboard a Chromebook device seamlessly using a wired network connection. For example, the Chromebook client management system 108 can use a wired connection to retrieve an identification of a Chromebook device and subsequently install, on the Chromebook device, a unique pre-shared key assigned to the Chromebook device using the identification of the Chromebook device. Further in the example, the Chromebook client management system 108 can then configure the Chromebook device to wirelessly access a wireless, disconnect the Chromebook device from the wired connection, and subsequently cause the wireless network to access the wireless network through a wireless connection in a manner agnostic to a user of the Chromebook device.

In a specific implementation, the Chromebook client management system 108 functions to detect a user's presence in utilizing a Chromebook device. In various implementations, the Chromebook client management system 108 can transmit data to and from a Chromebook device for use in onboarding and/or authenticating the Chromebook device when a user's presence in utilizing the Chromebook device is detected. Depending upon implementation-specific or other considerations, the Chromebook client management system 108 can detect a user's presence in utilizing the Chromebook device when a user logs into the Chromebook device. For example, when a user inputs their login credentials, e.g. a username and password, then the Chromebook client management system 108 can detect a user's presence in utilizing the Chromebook device. Further in the example, the Chromebook client management system 108 can return login credentials of the user, e.g. the username, for use in onboarding the Chromebook device to access a wireless network. Further depending upon implementation-specific or other considerations, the Chromebook client management system 108 can detect a user's presence in utilizing a Chromebook device when a user establishes or attempts to establish a connection to a network using the Chromebook device. For example, the Chromebook client management system 108 can detect a user's presence in utilizing a Chromebook device when a user establishes a connection to a network over a wired connection form the Chromebook device.

In a specific implementation, the Chromebook client management system 108 functions to embed a preexisting Open Network Computing (ONC) file, or other remote procedure call (RPC)-generated file, onto a Chromebook device and configure the ONC file to allow the Chromebook device to gain access to a wireless network. In various implementations, the Chromebook client management system 108 can configure an ONC file embedded on a Chromebook device to gain access to a wireless network based on date received from an applicable system for authenticating a device for accessing a wireless network, such as the identity platform systems described in this paper. For example, the Chromebook client management system 108 can insert/edit an SSID and/or unique pre-shared key values into an embedded ONC file according to received data for authenticating a Chromebook client, e.g. an SSID and or a private pre-shared key assigned to a Chromebook device, to allow the Chromebook client to be authenticated for a wireless network. Further in the example, the Chromebook client management system 108 can insert/edit an embedded ONC file based on data received from an applicable system for onboarding and/or authenticating a Chromebook device, such as the identity platform systems described in this paper. In various implementations, when an ONC file is configured with an SSID and/or unique pre-shared key values, the ONC file can functions as if a unique pre-shared key is installed on a Chromebook device, and therefore can be referred to as a unique pre-shared key.

In an example of operation of the example system shown in FIG. 1, the Chromebook device 104 is a Chromebook based device attempting to access a wireless network. In the example of operation of the example system shown in FIG. 1, the identity platform system 106 onboards and authenticates the Chromebook device 104 by assigning a unique pre-shared key to the Chromebook device 104. Further, in the example of operation of the example system shown in FIG. 1, the Chromebook client management system 108 functions to install the unique pre-shared key at the Chromebook device 104 and exchange data, generated using the key, between the Chromebook device 104 and the identity platform system 106 for use in authenticating the Chromebook device 104 for accessing the wireless network seamlessly.

Figure 2:
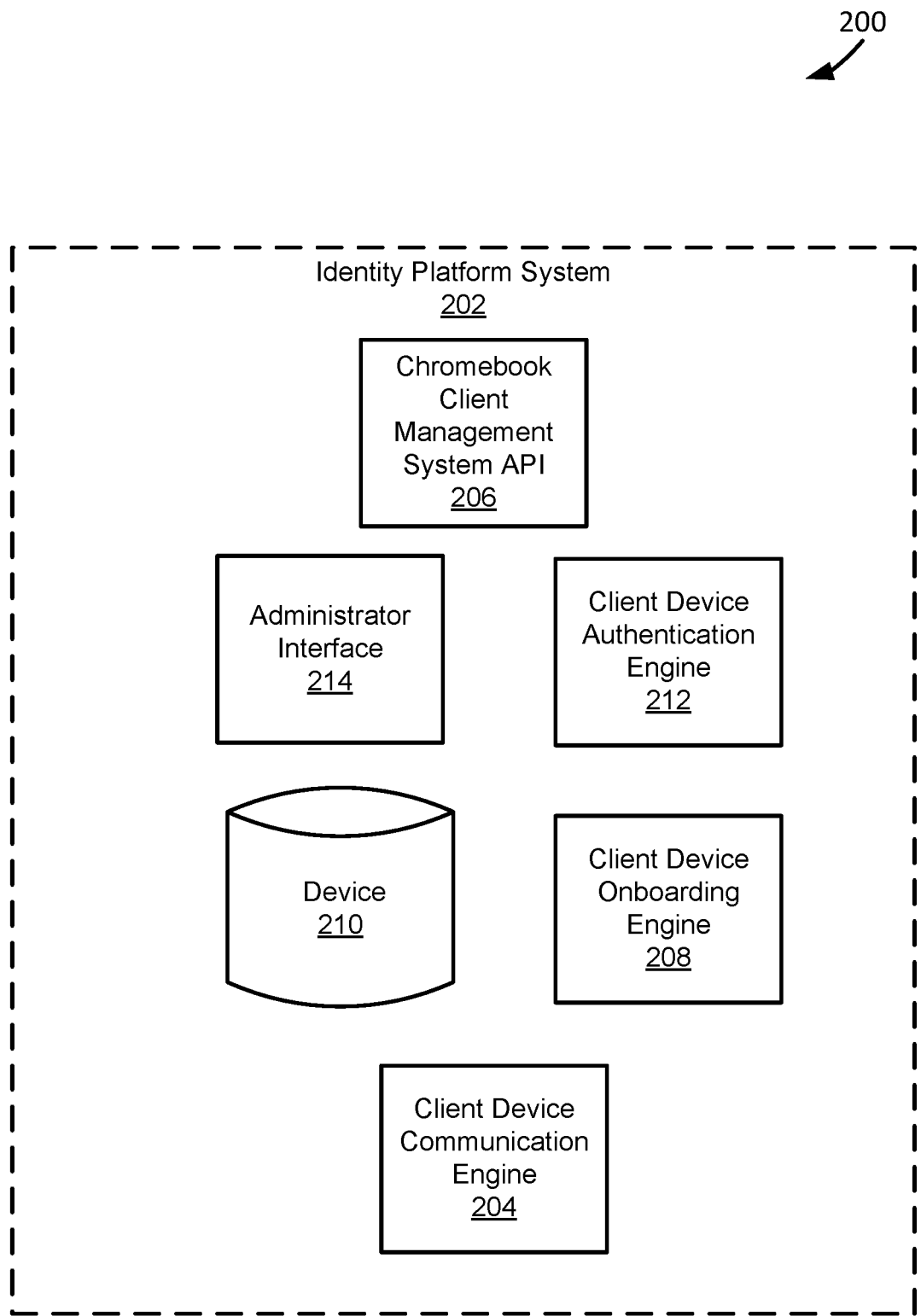
FIG. 2 depicts a diagram of an example of an identity platform system 202 for managing device credentials and access to a network by client devices.

FIG. 2 depicts a diagram 200 of an example of an identity platform system 202 for managing device credentials and access to a network by client devices. The identity platform system 202 functions according to an applicable system for managing device credentials and access to a network by client devices, such as the identity platform systems described in this paper. Depending upon implementation-specific or other considerations, the identity platform system 202 can onboard a client device for accessing a network by assigning a unique pre-shared key to the device for use in authenticating the device for the network. Further depending upon implementation-specific or other considerations, the identity platform system 202 can authenticate a client device for accessing a network based on a unique pre-shared key assigned to the device. For example, the identity platform system 202 can authenticate a Chromebook device for accessing a network. In onboarding and authenticating client devices and managing credentials for client devices, the identity platform system 202 can function as an active directory. In various implementations, the identity platform system include an API that is used to transmit data through an applicable system, such as the Chromebook client management systems 108 described in this paper, for onboarding and/or authenticating a Chromebook device.

In a specific implementation, the identity platform system 202 authenticates a Chromebook device based on data received from the Chromebook device. For example, the identity platform system 202 can receive authentication data generated from a unique pre-shared key or an ONC file installed at a Chromebook device to authenticate the Chromebook device. Depending upon implementation-specific or other considerations, the identity platform system 202 can receive authentication data directly from a Chromebook device. For example, after a unique pre-shared key is installed on a Chromebook device and it is configured to access a wireless network, then the Chromebook device can directly send authentication data to the identity platform system 202 to authenticate the Chromebook device. Further depending upon implementation, specific or other considerations, the identity platform system 202 can receive authentication data through an applicable system for transmitting data between the identity platform system 202 and a Chromebook device, such as the Chromebook client management systems described in this paper. For example, after a Chromebook device is onboarded, the identity platform system 202 can receive authentication data through an API that couples the identity platform system 202 to an applicable system for transmitting data between the identity platform system 202 and the Chromebook device, such as the Chromebook client management systems described in this paper, each time the Chromebook device tries to connect to a wireless network.

The example identity platform system 202 shown in FIG. 2 includes a client device communication engine 204, a Chromebook client management system API 206, a client device onboarding engine 208, a device datastore 210, a client device authentication engine 212, and an administrator interface 214. The device communication engine 204 functions to send and receive data to and from a client device. In various implementations, the device communication engine 204 functions to send and receive data to and from a Chromebook device. Data transmitted between the corporate device communication engine 204 and a client device can be used in authenticating and onboarding the corporate-assigned device for accessing a network. Depending upon implementation-specific or other considerations, the client device communication engine 204 receives authentication data directly from a Chromebook device, for use in authenticating the Chromebook device for accessing a wireless network. For example, a Chromebook device can generate authentication data from a unique pre-shared key assigned to the Chromebook device and transmit the authentication data directly to the client device communication engine 204.

The Chromebook client management system API 206 functions to provide the identity platform system 202 with access to an applicable system for configuring a Chromebook device to access a wireless network, such as the Chromebook client management systems described in this paper. Depending upon implementation-specific or other considerations, the Chromebook client management system API 206 can be used receive onboarding characteristics data for a Chromebook device. Onboarding characteristics data includes applicable data used in onboarding a client device, such as an identification of a client device or an identification of a user. For example, the Chromebook client management system API 206 can be used to receive a username of a user utilizing a Chromebook and a MAC address of the Chromebook. Further depending upon implementation-specific or other considerations, the Chromebook client management system API 206 can be used to transmit data used in authenticating a Chromebook device. For example, the Chromebook client management system API 206 can be used, in part, to transmit to a Chromebook device a unique pre-shared key assigned to the Chromebook device as part of onboarding. In another example, the Chromebook client management system API 206 can be used to transmit data indicating an SSID and/or a unique pre-shared key value for configuring a Chromebook device to be authenticated for accessing a wireless network.

The client device onboarding engine 208 functions to onboard a client device for accessing a wireless network. In onboarding a client device for accessing a wireless network, the client device onboarding engine 208 can assign a unique pre-shared key to a client device, e.g. a Chromebook device. Depending upon implementation-specific or other considerations, a unique pre-shared key assigned to a client device can be uniquely associated with only the client device, a plurality of client devices including the client device, and/or a user of the client device, or a plurality of users including the user of the client device. In assigning a unique pre-shared key to a client device, the client device onboarding engine 208 can update unique pre-shared key associated device data to indicate that the unique pre-shared key has been assigned to the client device and/or the user of the client device. Depending upon implementation-specific or other considerations, the client device onboarding engine 208 can set an expiration time on a unique pre-shared key assigned to a client device and/or a user. The client device onboarding engine 208 can update unique pre-shared key associated device data to indicate an expiration time of a unique pre-shared key assigned to a client device and/or a user.

In a specific implementation, the client device onboarding engine 208 functions to assign a new unique pre-shared key or reassign a unique pre-shared key to a client device and/or a user. Depending upon implementation-specific or other considerations, the client device onboarding engine 208 can assign a new unique pre-shared key or reassign a previously assigned unique pre-shared key to client device and/or a user in response to an indication that a previously assigned unique pre-shared key has expired. For example, if the client device onboarding engine 208 receives an indication that a unique pre-shared key assigned to a specific Chromebook device has expired, then the client device onboarding engine 208 can assign a new unique pre-shared key to the Chromebook device. In another example, if the client device onboarding engine 208 receives an indication that a unique pre-shared key assigned to a specific user has expired, then the client device onboarding engine 208 can assign a new unique pre-shared key to the user. Further depending upon implementation-specific or other considerations, the client device onboarding engine 208 can assign a new unique pre-shared key or reassign a previously assigned unique pre-shared key to a client device and/or a user in response to input received from an administrator. For example, if an administrator inputs to assign a new unique pre-shared key to a Chromebook device, then the corporate device onboarding engine 208 can assign a new unique pre-shared key to the Chromebook device. The client device onboarding engine 208 can update unique pre-shared key associated device data to indicate a new unique pre-shared key assigned to a client device and/or a user, or a unique pre-shared key reassigned to a client device and/or a user.

In a specific implementation, the client device onboarding engine 208 functions to associate a user with a client device. For example, the client device onboarding engine 208 can associated a student to whom a Chromebook device is given with the Chromebook device. The client device onboarding engine 208 can update unique pre-shared key associated device data to indicate a user associated with a client device. Depending upon implementation-specific or other considerations, the client device onboarding engine 208 can associate a user with a client device based on a provided identification of a user and an identification of a client device. For example, if a user name of a user of a Chromebook device and a MAC address of the Chromebook device is provided as part of the onboarding process, the client device onboarding engine 208 can associate the user with the Chromebook device. Further depending upon implementation-specific or other considerations, the client device onboarding engine 208 can associate a client device with a user based on input from an administrator. For example, a teacher can input identifications of Chromebook devices given to specific students, and the client device onboarding engine 208 can associate the students with the corresponding Chromebook devices given to the specific students.

In a specific implementation, the client device onboarding engine 208 functions to disassociate a client device from a unique pre-shared key and/or a user. In various implementations, the client device onboarding engine 208 can dissociate a client device in response to instructions from an administrator received through an applicable interface, such as the administrator interfaces described in this paper. For example, if a student has lost their Chromebook device, then an administrator can instruct the client device onboarding engine 208 to disassociate the Chromebook device and/or the student from a unique pre-shared key, and the client device onboarding engine 208 can subsequently disassociate the Chromebook device and/or the student from the pre-shared key.

In a specific implementation, the client device onboarding engine 208 functions to provide data for configuring a client device to authenticate for a wireless network. Depending upon implementation-specific or other considerations, the client device onboarding engine 208 can provide an SSID value for use in configuring a client device to connect to a wireless network. Further depending upon implementation-specific or other considerations, the client device onboarding engine 208 can provide a unique pre-shared key value for use in configuring a client device to connect to a wireless network. In various implementations, an SSID value and/or a unique pre-shared key value can be used to configure an embedded ONC file on a client device for use in accessing a wireless network.

The device datastore 210 functions to store unique pre-shared key associated device data. Unique pre-shared key associated device data stored in the device datastore 210 can include identifications of client devices, e.g. a MAC address, identifications of users, e.g. usernames, and unique pre-shared keys assigned to the client devices and/or user. For example, unique pre-shared key associated device data stored in the device datastore 210 can include an identification of a student who uses a specific Chromebook device.

The client device authentication engine 212 functions to authenticate a client device for accessing a wireless network. The client device authentication engine 212 can authenticate a client device for accessing a wireless network based on a unique pre-shared key assigned to the client device. For example, the client device authentication engine 212 can use authentication data received from a Chromebook device to determine that the authentication data was created from a unique pre-shared key assigned to the Chromebook device and subsequently authenticate the Chromebook device for accessing a wireless network. In various implementations, the client device authentication engine 212 can use unique pre-shared key associated device data to authenticate a client device for accessing a wireless network. For example, the client device authentication engine 212 can use unique pre-shared key associated device data to determine a unique pre-shared key assigned to a client device, and subsequently determine if authentication data received from the client device is created using the unique pre-shared key in determining whether to authenticate the client device.

In a specific implementation, the client device authentication engine 212 functions to determine if a unique device is using a valid unique pre-shared key. Depending upon implementation-specific or other considerations, the client device authentication engine 212 can determine whether a unique pre-shared key is specifically assigned to a client device or whether a unique pre-shared key has expired. The client device authentication engine 212 can determine whether a unique pre-shared key is specifically assigned to a client device or whether a unique pre-shared key has expired using unique pre-shared key associated device data. For example, the client device authentication engine 212 can determine that a pre-shared key assigned to a Chromecast device has expired based on unique pre-shared key associated device data. In various implementations, the client device authentication engine 212 can instruct an applicable engine for onboarding a client device, such as the client device onboarding engines described in this paper, to assign a new unique pre-shared key or reassign a unique pre-shared key to a client device.

In a specific implementation, the client device authentication engine 212 functions to provide data for configuring a client device to authenticate for a wireless network. Depending upon implementation-specific or other considerations, the client device authentication engine 212 can provide an SSID value for use in configuring a client device to connect to a wireless network. Further depending upon implementation-specific or other considerations, the client device authentication engine 212 can provide a unique pre-shared key value for use in configuring a client device to connect to a wireless network. In various implementations, an SSID value and/or a unique pre-shared key value can be used to configure an embedded ONC file on a client device for use in accessing a wireless network.

The administrator interface 214 functions to provide an interface through which an administrator can interact with the identity platform system 202. In interacting with an identity platform system 202 through the administrator interface 214, an administrator can manage authentication and onboarding of client devices for a wireless network. For example, an administrator can input, through the administrator interface 214, to onboard all Chromebooks devices given to students in a class. In another example, an administrator can input, through the administrator interface 214, that a Chromebook device has been lost and should disassociated from a unique pre-shared key assigned to the Chromebook device.

In an example of operation of the example system shown in FIG. 2, the client device communication engine 204 functions to transmit and receive data for use in onboarding and authenticating a client device for access to a wireless network. In the example of operation of the example system shown in FIG. 2, the client device onboarding engine 208 onboards the Chromecast device by assigning a unique pre-shared key to the Chromecast device, as indicated by unique pre-shared key associated device data stored in the corporate device datastore 208 using data received from an applicable system for managing the Chromebook device in accessing a wireless network, such as the Chromebook client management systems described in this paper. Further, in the example of operation of the example system shown in FIG. 2, the client device authentication engine 212 authenticates the Chromebook device by using authentication data received from the Chromebook device through the Chromebook client management system API 206 and the unique pre-shared key associated device data stored in the device datastore 210.

Figure 3:
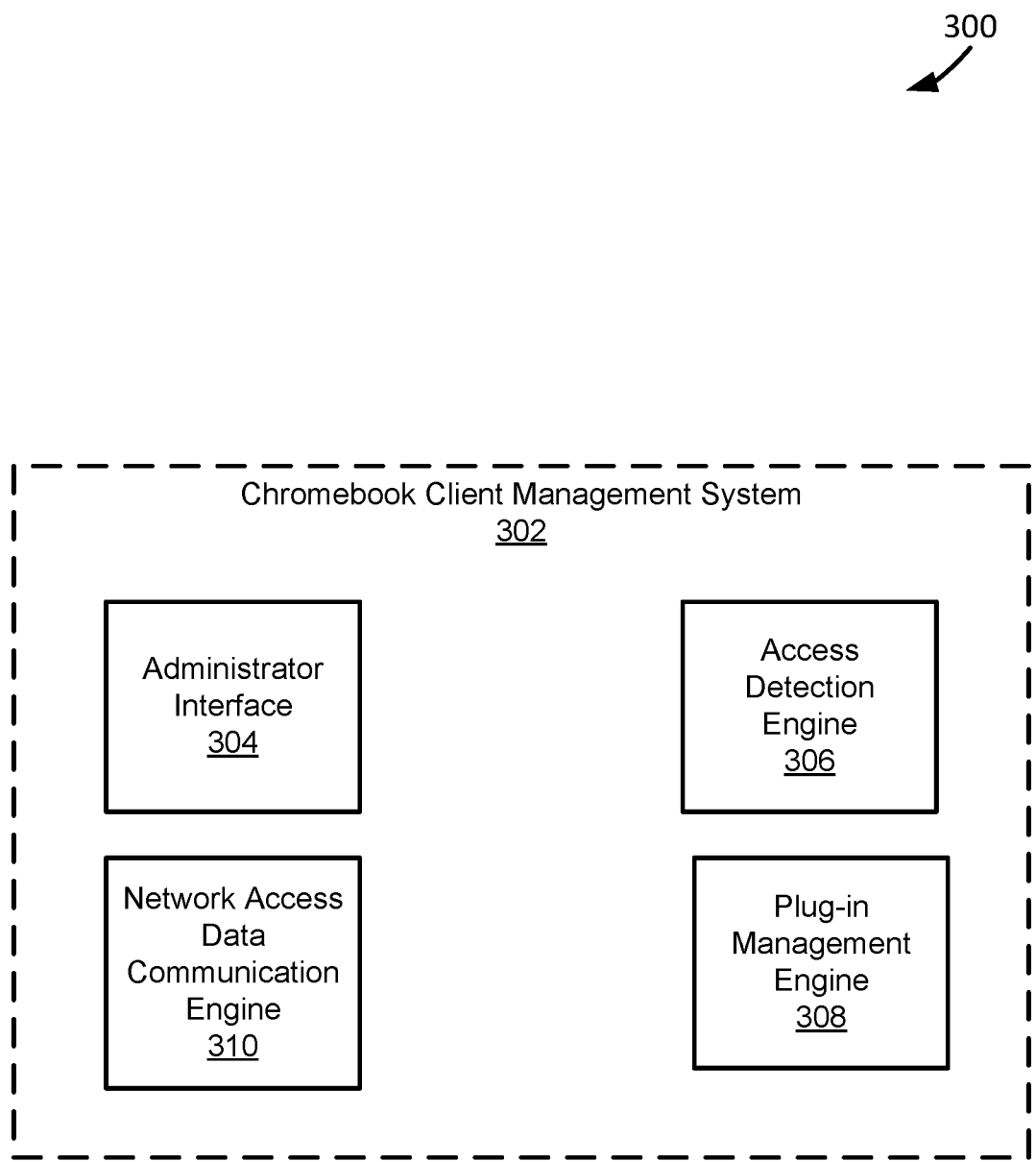
FIG. 3 depicts a diagram of an example of a Chromebook client management system 302 for assisting in providing Chromebook devices with access to a wireless network.

FIG. 3 depicts a diagram 300 of an example of a Chromebook client management system 302 for assisting in providing Chromebook devices with access to a wireless network. The Chromebook client management system 302 functions according to an applicable system for aiding in configuration of Chromebook devices to access a wireless network, such as the Chromebook client management systems described in this paper. In various implementations, the Chromebook client management system 302 can operate in conjunction with an applicable system for managing client device access to a wireless network, such as the identity platform systems described in this paper, to provide Chromebook devices with access to a wireless network. For example, the Chromebook client management system 302 can transmit identification data, e.g. an identification of a Chromebook device or a user of the Chromebook device, for use in onboarding the Chromebook device. In another example, the Chromebook client management system 302 can transmit authentication data generated at a Chromebook device, for use in authenticating the Chromebook device. In various implementations, the Chromebook client management system 302 can transmit data to an applicable system for managing client device access to a wireless network, such as the identity platform systems described in this paper, using an applicable API.

The example Chromebook client management system 302 shown in FIG. 3 includes an administrator interface 304, an access detection engine 306, a plug-in management engine 308, and a network access data communication engine 310. The administrator interface 304 functions as an applicable interface through which an administrator can instruct the Chromebook client management system 302 to perform functions. Depending upon implementation-specific or other considerations, through the administrator interface 304, an administrator can create user groups of Chromebook devices. For example, a teacher can input, through the administrator interface 304 a listing of Chromebook devices in a class to be grouped together. Further depending upon implementation-specific or other considerations, an administrator, through the administrator interface 304, can create device groups of Chromebook devices. For example, a teacher can input a listing of Chromebook devices of the same type in a class to be grouped together.

In a specific implementation, an administrator can input, through the administrator interface 304, instructions for installing a Chromebook unique pre-shared key plug-in on Chromebook devices. Depending upon implementation-specific or other considerations, an administrator can select a Chromebook unique pre-shared key plug-in and instruct the Chromebook client management system 302 to install the plug-in on Chromebook devices. For example, an administrator can select a Chromebook unique pre-shared key plug-in from an application store, and input, through the administrator interface 304, instructions to install the specific Chromebook unique pre-shared key plug-in to Chromebook devices. Further depending upon implementation-specific or other considerations, an administrator can input, through the administrator interface 304, instructions indicating Chromebook devices on which to install a Chromebook unique pre-shared key plug-in. For example, a teacher can input, through the administrator interface 304, instructions to install a plug-in on Chromebook devices within a specific user group, such as students in a class. In another example, a teacher can input, through the administrator interface 304, instructions to install a plug-in on Chromebook devices within a specific device group.

The access detection engine 306 functions to detect a user's presence in utilizing a Chromebook device. Depending upon implementation-specific or other considerations, the access detection engine 306 can detect a user's presence in utilizing the Chromebook device when a user logs into the Chromebook device. For example, when a user inputs their login credentials, e.g. a username and password, into a Chromebook device, then the access detection engine 306 can detect a user's presence in utilizing the Chromebook device. Further depending upon implementation-specific or other considerations, the access detection engine 306 can detect a user's presence in utilizing a Chromebook device when a user establishes or attempts to establish a connection to a network using the Chromebook device. For example, the access detection engine 306 can detect a user's presence in utilizing a Chromebook device when a user establishes a connection to a network over a wired connection using the Chromebook device.

The plug-in management engine 308 functions to manage installation of Chromebook unique pre-shared key plug-ins on Chromebook devices. In various implementations, the plug-in management engine 308 can select a Chromebook unique pre-shared key plug-in to install at a Chromebook device, and push the Chromebook unique pre-shared key plug-in to the Chromebook device for installation. Depending upon implementation-specific or other considerations, the plug-in management engine 308 can select a Chromebook unique pre-shared key plug-in to install at a Chromebook device. For example, the plug-in management engine 308 can select a Chromebook unique pre-shared key plug-in to install on a Chromebook device based on a device type of the Chromebook device. Further depending upon implementation-specific or other considerations, the plug-in management engine 308 can select a Chromebook unique pre-shared key plug-in to install based on input received from an administrator. For example, a teacher can input instructions to install a specific Chromebook unique pre-shared key plug-in on specific Chromebook devices, and the plug-in management engine 308 can select the specific Chromebook unique pre-shared key plug-in and push it to the specific Chromebook devices for installation, in response to the instructions.

The network access data communication engine 310 functions to communicate data between a Chromebook device and an applicable system for managing client device access to a wireless network, such as the identity platform systems described in this paper. The network access data communication engine 310 can communicate identification data, for use in onboarding a Chromecast device. For example, the network access data communication engine 310 can communicate identification data of a Chromebook device, used to associate the Chromebook device or a user utilizing the Chromebook device to a unique pre-shared key as part of onboarding. In various implementations, the network access data communication engine 310 can transfer data to an applicable system for managing client device access to a wireless network, such as the identity platform systems described in this paper, using an API of the system.

In a specific implementation, the network access data communication engine 310 functions to communicate data to a Chromebook device for use in authenticating the Chromebook device to use a wireless network. In various implementations, the network access data communication engine 310 communicates data for authenticating a Chromebook device between the Chromebook device and an applicable system for managing client device access to a wireless network, such as the identity platform systems described in this paper. Depending upon implementation-specific or other considerations, the network access data communication engine 310 can communicate a unique pre-shared key assigned to a Chromebook device for use in authenticating the Chromebook device for a wireless network. For example, the network access data communication engine 310 can receive a unique pre-shared key assigned to a Chromebook device from an applicable system for managing client device access to a wireless network, such as the identity platform systems described in this paper, and transmit the unique pre-shared key to the Chromebook device. Further depending upon implementation-specific or other considerations, the network access data communication engine 310 can communicate authentication data used in authenticating a Chromebook device for accessing a wireless network. For example, the network access data communication engine 310 can transmit from a Chromebook device, authentication data generated from a unique pre-shared key assigned to the Chromebook device, to an applicable system for managing client device access to a wireless network, such as the identity platform systems described in this paper, for use in authenticating the Chromebook device.

In an example of operation, of the example system shown in FIG. 3, the administrator interface provides an interface through which an administrator can send instructions regarding installation of a Chromebook unique pre-shared key plug-in on a Chromebook device. In the example of operation of the example system shown in FIG. 3, the plug-in management engine 308 installs the Chromebook unique pre-shared key plug-in according to the instructions received from the administrator. Further, in the example of operation of the example system showed in FIG. 3, the access detection engine 306 functions to detect a user's presence in utilizing the Chromebook device. In the example of operation of the example system shown in FIG. 3, the network access data communication engine 310 transmits data for use in authenticating the Chromebook device in accessing a wireless network, when the user's presence is detected by the access detection engine 306.

Figure 4:
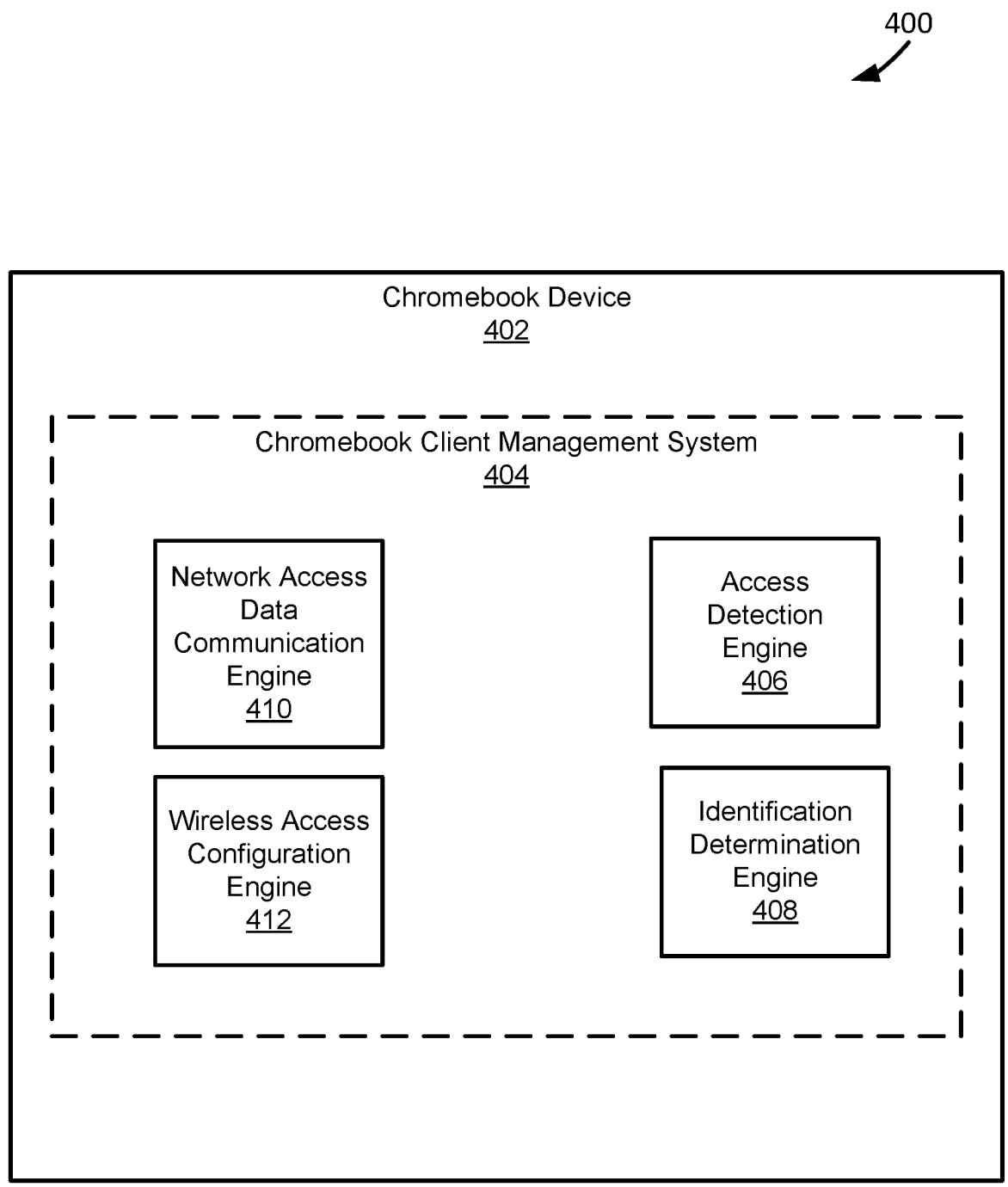
FIG. 4 depicts a diagram of an example of a system implemented on a Chromebook device 402 for managing access to a wireless network.

FIG. 4 depicts a diagram 400 of an example of a system implemented on a Chromebook device 402 for managing access to a wireless network. The Chromebook device 402 functions according to an applicable Chromebook device running Chrome OS, such as the Chromebook devices described in this paper. Depending upon implementation-specific or other considerations, the Chromebook device 402 can be associated with an organization or associated with a user associated with an organization. For example, the Chromebook device 402 can be assigned to a student at a school.

The Chromebook client management system 404 functions, at least in part, according to an applicable system for use is configuring the Chromebook device 402 to access a wireless network. The Chromebook client management system 404 can be implanted on the Chromebook device 402 as a Chromebook unique pre-shared key plug-in. In various implementations, the Chromebook client management system 404 can be installed on the Chromebook device 402 in response to instructions received from an administrator. For example, the Chromebook device 402 can be assigned to a student in a class, and a teacher can input instructions to cause the Chromebook client management system 404 to be installed on the Chromebook device 402. In various implementations, the Chromebook client management system 404 can generate and/or transmit authentication data for authenticating the Chromebook 402 for accessing a wireless network when a user's presence is detected at the Chromebook device 402.

The Chromebook client management system 404 includes an access detection engine 406, an identification determination engine 408, a network access data communication engine 410, and a wireless access configuration engine 412. The access detection engine 406 functions according to an applicable engine for detecting a user's presence in interacting with the Chromebook device 402, such as the access detection engines described in this paper. Depending upon implementation-specific or other considerations, the access detection engine 406 can detect a user's presence in utilizing the Chromebook device 402 when a user logs into the Chromebook device 402. For example, when a user inputs their login credentials, e.g. a username and password, into the Chromebook device 402, then the access detection engine 406 can detect the user's presence in utilizing the Chromebook device 402. Further depending upon implementation-specific or other considerations, the access detection engine 406 can detect a user's presence in utilizing the Chromebook device 402 when a user establishes or attempts to establish a connection to a network using the Chromebook device 402. For example, the access detection engine 406 can detect a user's presence in utilizing the Chromebook device 402 when the user establishes a connection to a network over a wired connection using the Chromebook device 404.

The identification determination engine 408 functions to determine identifications for use in onboarding and/or authenticating the Chromebook device 402. In determining identifications for use in onboarding and/or authenticating the Chromebook device 402, the identification determination engine 408 can generate identification data. Depending upon implementation-specific or other considerations, the identification determination engine 408 can determine an identification of a Chromebook device. For example, the identification determination engine 408 can determine an identification of a Chromebook device based on a MAC address of the Chromebook device, or a device type of the Chromebook device. Further depending upon implementation-specific or other considerations, the identification determination engine 408 can determine an identification of a user of a Chromebook device. For example, based on login credentials, e.g. a username, of a user of a Chromebook device, the identification determination engine 408 can determine an identification of the user. In various implementations, the identification determination engine 408 can determine identifications when a user's presence in utilizing a Chromebook is detected. For example, when a user connects a Chromebook to a network through a wired connection, then the identification determination engine 408 can determine an identification of the Chromebook.

The network access data communication engine 410 functions according to an applicable engine for communicating data for use in onboarding and/or authenticating the Chromebook device 402, such as the network access data communication engines described in this paper. The network access data communication engine 410 can communicate data with an applicable system for managing client device access to a network, such as the identity platform systems described in this paper. For example, the network access data communication engine 410 can transmit authentication data to an applicable system for managing client device access to a network, such as the identity platform systems described in this paper, for use in authenticating the Chromebook device. In various implementations, the network access data communication engine 410 can communicate data for onboarding and/or authenticating the Chromebook device 402 based on whether a user's presence in interacting with the Chromebook device 402 is detected. For example, the network access data communication engine 410 can communicate authentication data from the Chromebook device 402 when a user logs on to use the Chromebook device 402.

Depending upon implementation-specific or other considerations, the network access data communication engine 410 functions to communicate data used in onboarding the Chromebook device 402 to access a wireless network. Depending upon implementation-specific or other considerations, the network access data communication engine 410 can transmit identification data from the Chromebook device 402, for use in onboarding the Chromebook device. For example, the network access data communication engine 410 can transmit a MAC address of the Chromebook device 402 for the purposes of onboarding the Chromebook device 402. Further depending upon implementation-specific or other considerations, the network access data communication engine 410 can receive a unique pre-shared key or unique pre-shared key value of a unique pre-shared key assigned to the Chromebook device 402, for onboarding the Chromebook device 402. For example, the network access data communication engine 410 can receive a unique pre-shared key specifically assigned to the Chromebook device 402 as part of onboarding the Chromebook device 402. In various implementations, the network access data communication engine 410 can communicate data for onboarding the Chromebook device 402 based on whether a user's presence in interacting with the Chromebook device 402 is detected. For example, the network access data communication engine 410 can communicate identification data from the Chromebook device 402 when a user logs on to use the Chromebook device 402.

The wireless access configuration engine 412 functions to manage, at the Chromebook device 402, access of the Chromebook device 402 to a wireless network. In managing access to a wireless network, the wireless access configuration engine 412 can manage onboarding and authentication of the Chromebook device 402. In managing onboarding, the wireless access configuration engine 412 can configure the Chromebook device 402 to access a network using a unique pre-shared key assigned to the Chromebook device 402. Depending upon implementation-specific or other considerations, the wireless access configuration engine 412 can install a received unique pre-shared key onto the Chromebook device 402 for use in authenticating for a network. Further depending upon implementation-specific or other considerations, the wireless access configuration engine 410 can install an ONC file created using a received pre-shared key onto the Chromebook device 402. Further depending upon implementation-specific or other considerations, the wireless access configuration engine 412 can configure a preinstalled ONC file on the Chromebook device 402 for use in authenticating for a network. For example, the wireless access configuration engine 412 can insert into a pre-existing ONC file on the Chromebook device 402 a unique pre-shared key value and/or an SSID for use in authentication.

In a specific implementation, the wireless access configuration engine 412 functions to generate authentication data for use in authenticating the Chromebook device 402 to access a network. Depending upon implementation-specific or other considerations, the wireless access configuration engine 412 can generate authentication data from a unique pre-shared key installed at the Chromebook device 402. Further depending upon implementation-specific or other considerations, the wireless access configuration engine 412 can generate authentication data from an ONC file on the Chromebook device 402 created and/or edited based, at least in part, on a unique pre-shared key assigned to the Chromebook device 402. For example, the wireless access configuration engine 412 can generate authentication data from unique pre-shared key values inserted into a pre-existing ONC file on the Chromebook device 402. In various implementations, the wireless access configuration engine 412 can generate authentication data for authenticating the Chromebook device 402 based on whether a user's presence in interacting with the Chromebook device 402 is detected. For example, the wireless access configuration engine 412 can generate authentication data when a user logs on to use the Chromebook device 402.

In an example of operation of the example system shown in FIG. 4, the access detection engine 406 detects a user's presence in interacting with the Chromebook device 402. In the example of operation of the example system shown in FIG. 4, the identification determination engine 408 determines an identification of the Chromebook device 402 for purposes of onboarding the Chromebook device 402 to access a wireless network, in response to the access detection engine 406 detecting the user's presence. Further, in the example of operation of the example system shown in FIG. 4, the network access data communication engine 410 transmits the identification of the Chromebook device 402 for use in assigning a unique pre-shared key. In the example of operation of the example system shown in FIG. 4, the wireless access configuration engine 412 configures the Chromebook device 402 to access the wireless network based on the unique pre-shared key.

Figure 5:
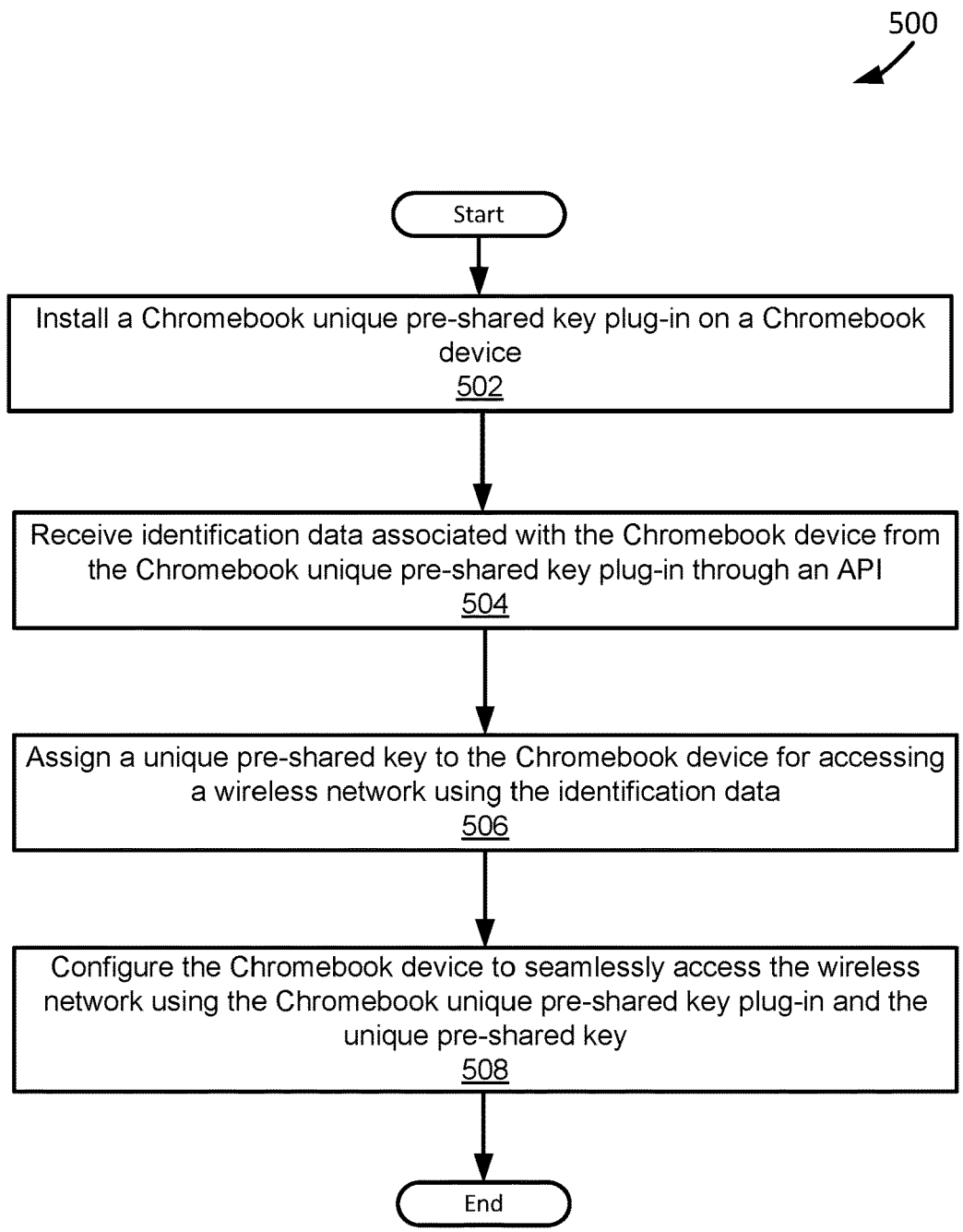

FIG. 5 depicts a flowchart 500 of an example of a method for onboarding a Chromebook device for accessing a wireless network using a Chromebook unique pre-shared key plug-in. The flowchart 500 begins at module 502, where a Chromebook unique pre-shared key plug-in is installed at a Chromebook device. An applicable engine for managing a Chromebook unique pre-shared key plug-in, such as the plug-in management engines described in this paper, can function to install a Chromebook unique pre-shared key plug-in at a Chromebook device. A Chromebook unique pre-shared key plug-in can be installed at a Chromebook device in response to instruction from an administrator. For example, a teacher can instruct for a Chromebook unique pre-shared key plug-in to be installed at Chromebook devices of students in a class, and the Chromebook unique pre-shared key plug-in can be installed in response to such instructions. A Chromebook unique pre-shared key plug-in to install on a Chromebook device can be selected based on either or both a device type of the Chromebook device and a user of the Chromebook device.

The flowchart 500 continues to module 504, where identification data associated with the Chromebook device is received from the Chromebook unique pre-shared key plug-in through an API. An applicable system for managing client device access to a network, such as the identity platform systems described in this paper, can receive identification data associated with the Chromebook device the Chromebook unique pre-shared key plug-in through an API. An applicable engine for transmitting identification data, such as the network data access communication engines described in this paper, can send identification data associated with the Chromebook device the Chromebook unique pre-shared key plug-in through an API. Identification data can be generated by an applicable engine for generating identification data, such as the identification determination engines described in this paper. Depending upon implementation-specific or other considerations, identification data received from the Chromebook unique pre-shared key plug-in through an API can identify the Chromebook device and/or a user of the Chromebook device.

The flowchart 500 continues to module 506, where a unique pre-shared key is assigned to the Chromebook device for access a wireless network using the identification data. An applicable engine for assigning a unique pre-shared key to a client device, such as the client device onboarding engines described in this paper, can assign a unique pre-shared key to the Chromebook device for access a wireless network using the identification data. A unique pre-shared key assigned to the Chromebook device can be uniquely associated with the Chromebook device, a plurality of Chromebook devices including the Chromebook device, a user of the Chromebook device, and/or a plurality of users including the user. In assigning a unique pre-shared key to the Chromebook device, the Chromebook device is onboarded for accessing a wireless network.

The flowchart 500 continues to module 508, where the Chromebook device is configured to seamlessly access a wireless network using the Chromebook unique pre-shared key plug-in and the unique pre-shared key. An applicable engine for configuring a Chromebook device to access a wireless network using a unique pre-shared key, such as the wireless access configuration engines described in this paper, can configure the Chromebook device to seamlessly access a wireless network using the Chromebook unique pre-shared key plug-in and the unique pre-shared key. Depending upon implementation-specific or other considerations, the unique pre-shared key can be installed onto the Chromebook device for use in authenticating for a wireless network. Further depending upon implementation-specific or other considerations, an ONC file created using the unique pre-shared key can be installed onto the Chromebook device. Further depending upon implementation-specific or other considerations, a pre-existing ONC file on the Chromebook device can be configured for use in authenticating for a network.

Figure 6:
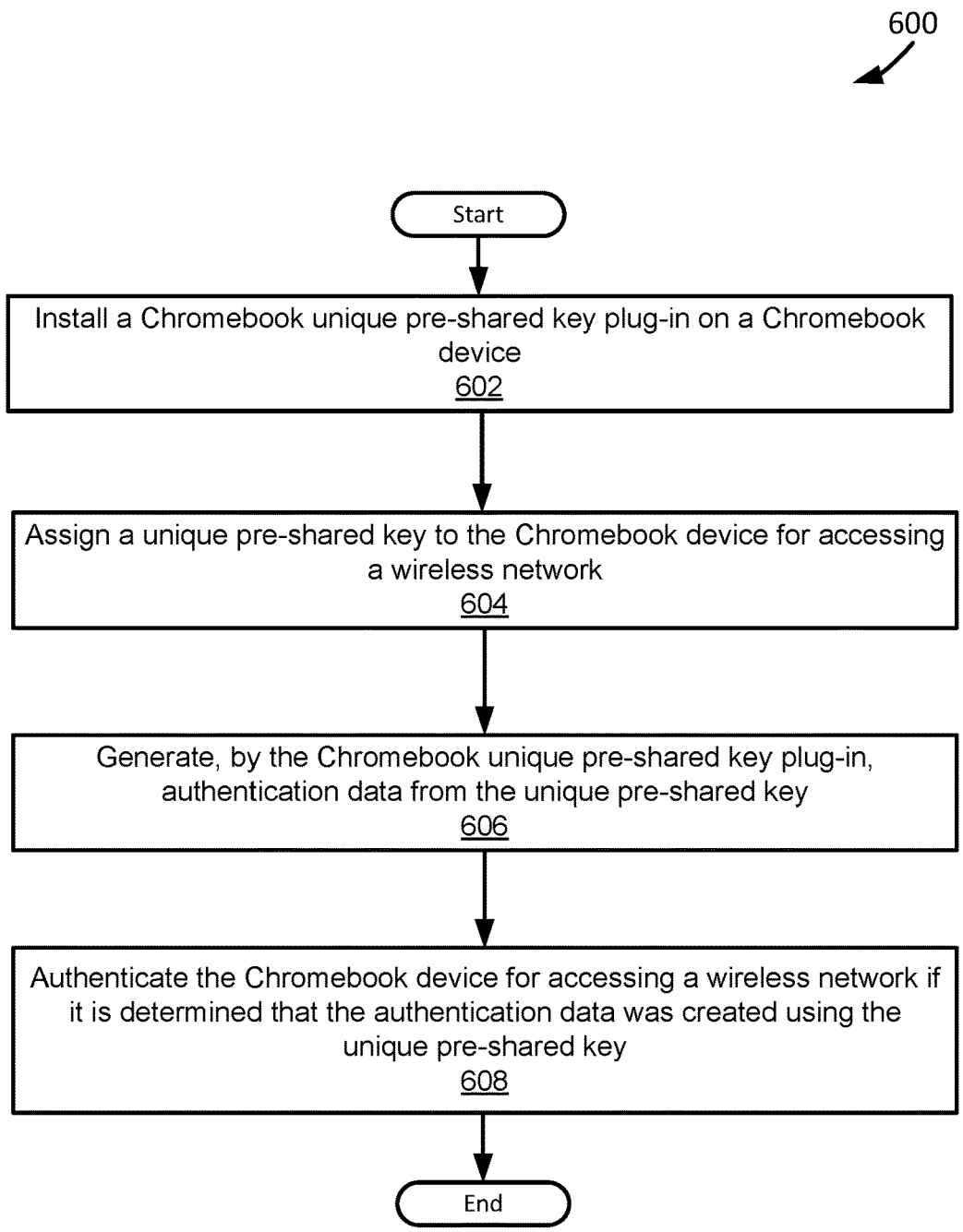

FIG. 6 depicts a flowchart 600 of an example of a method for authenticating a Chromecast device to access a wireless network using a Chromebook unique pre-shared key plug-in. The flowchart 600 begins at module 602, where a Chromebook unique pre-shared key plug-in is installed on a Chromebook device. An applicable engine for managing a Chromebook unique pre-shared key plug-in, such as the plug-in management engines described in this paper, can function to install a Chromebook unique pre-shared key plug-in at a Chromebook device. A Chromebook unique pre-shared key plug-in can be installed at a Chromebook device in response to instruction from an administrator. For example, a teacher can instruct for a Chromebook unique pre-shared key plug-in to be installed at Chromebook devices of students in a class, and the Chromebook unique pre-shared key plug-in can be installed in response to such instructions. A Chromebook unique pre-shared key plug-in to install on a Chromebook device can be selected based on either or both a device type of the Chromebook device and a user of the Chromebook device.

The flowchart 600 continues to module 604, where a unique pre-shared key is assigned to the Chromebook device for accessing a wireless network. An applicable engine for assigning a unique pre-shared key to a client device, such as the client device onboarding engines described in this paper, can assign a unique pre-shared key to the Chromebook device for access a wireless network using the identification data. A unique pre-shared key assigned to the Chromebook device can be uniquely associated with the Chromebook device, a plurality of Chromebook devices including the Chromebook device, a user of the Chromebook device, and/or a plurality of users including the user. In assigning a unique pre-shared key to the Chromebook device, the Chromebook device is onboarded for accessing a wireless network. A unique pre-shared key can be assigned to the Chromebook device based on identification data received from an applicable system for facilitating network access for the Chromebook device, such as the Chromebook client management systems described in this paper.

The flowchart 600 continues to module 606, where authentication data is generated from the unique pre-shared key by the Chromebook unique pre-shared key plug-in. An applicable engine for generating authentication data, such as the wireless access configuration engines described in this paper, can generate authentication data for authenticating the Chromebook device for a wireless network. Depending upon implementation-specific or other considerations, authentication data can be generated from the unique pre-shared key being installed at the Chromebook device. Further depending upon implementation-specific or other considerations, authentication data can be generated from an ONC file on the Chromebook device created and/or edited based, at least in part, on the unique pre-shared key assigned to the Chromebook device. For example, authentication data can be generated from unique pre-shared key values inserted into a pre-existing ONC file on the Chromebook device. In various implementations, authentication data for authenticating the Chromebook device can be generated based on whether a user's presence in interacting with the Chromebook device is detected. For example, authentication data can be generated when a user logs on to use the Chromebook device.

The flowchart 600 continues to module 608, where the Chromebook device is authenticated for accessing a wireless network if it is determined the authentication data was created using the unique pre-shared key. An applicable engine for authenticating a client device, such as the client device authentication engines described in this paper, can authenticate the Chromebook device for accessing a wireless network. In various implementations, unique pre-shared key associated device data can be used to determine if the authentication data was created using the unique pre-shared key assigned to the Chromebook device. For example, unique pre-shared key associated device data can be queried to identify a unique pre-shared key associated with the Chromebook device, and subsequently compare the key to the authentication data to determine if the authentication data was created using het unique pre-shared key.

Figure 7:
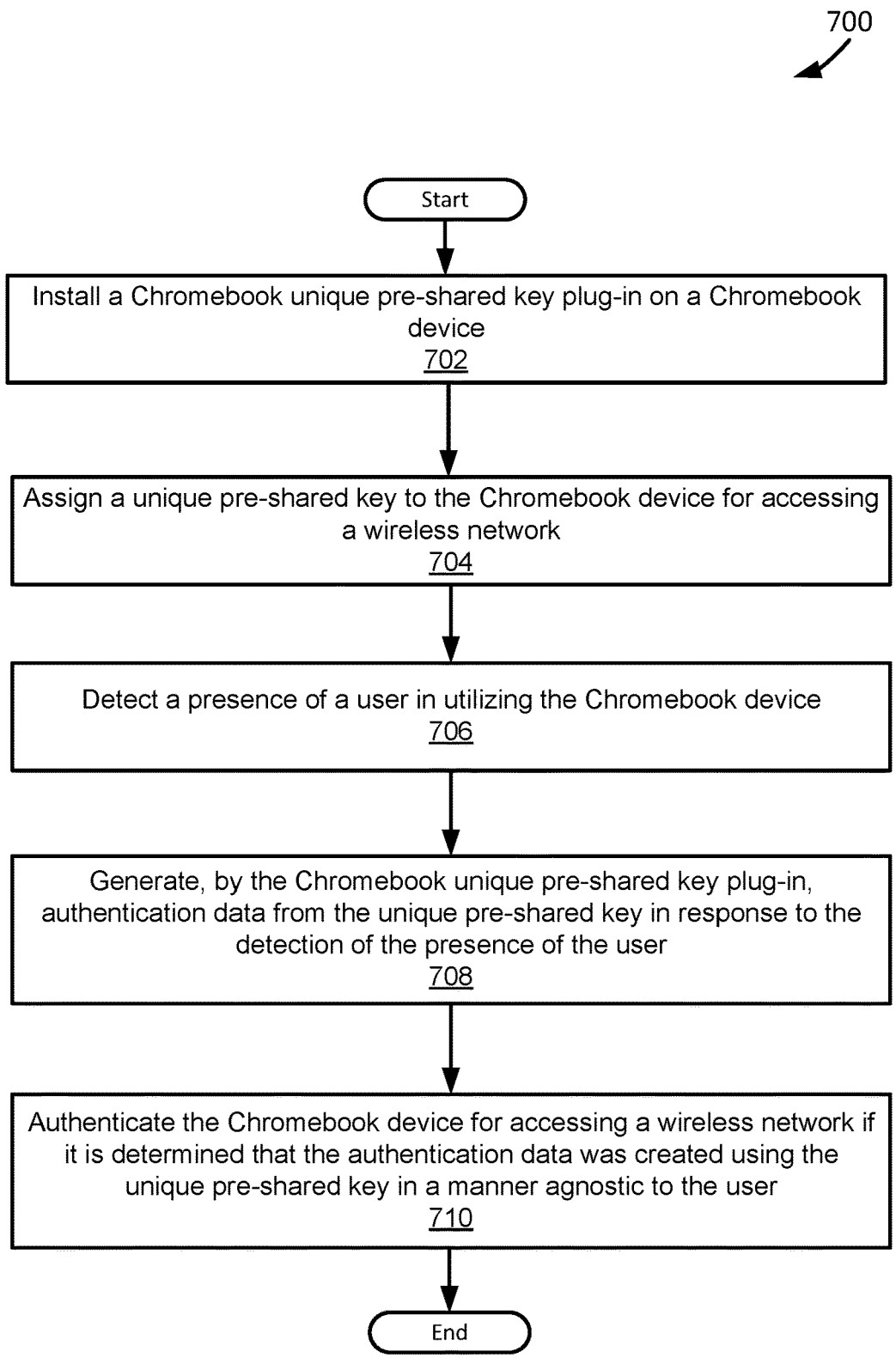
FIG. 7 depicts a flowchart of an example of a method for authenticating a Chromecast device to access a wireless network using a Chromebook unique pre-shared key plug-in in a manner agnostic to a user of the Chromebook device.

FIG. 7 depicts a flowchart 700 of an example of a method for authenticating a Chromecast device to access a wireless network using a Chromebook unique pre-shared key plug-in in a manner agnostic to a user of the Chromebook device. The flowchart 700 begins at module 702, where a Chromebook unique pre-shared key plug-in is installed on a Chromebook device. An applicable engine for managing a Chromebook unique pre-shared key plug-in, such as the plug-in management engines described in this paper, can function to install a Chromebook unique pre-shared key plug-in at a Chromebook device. A Chromebook unique pre-shared key plug-in can be installed at a Chromebook device in response to instruction from an administrator. For example, a teacher can instruct for a Chromebook unique pre-shared key plug-in to be installed at Chromebook devices of students in a class, and the Chromebook unique pre-shared key plug-in can be installed in response to such instructions. A Chromebook unique pre-shared key plug-in to install on a Chromebook device can be selected based on either or both a device type of the Chromebook device and a user of the Chromebook device.

The flowchart 700 continues to module 704, where a unique pre-shared key is assigned to the Chromebook device for accessing a wireless network. An applicable engine for assigning a unique pre-shared key to a client device, such as the client device onboarding engines described in this paper, can assign a unique pre-shared key to the Chromebook device for access a wireless network using the identification data. A unique pre-shared key assigned to the Chromebook device can be uniquely associated with the Chromebook device, a plurality of Chromebook devices including the Chromebook device, a user of the Chromebook device, and/or a plurality of users including the user. In assigning a unique pre-shared key to the Chromebook device, the Chromebook device is onboarded for accessing a wireless network. A unique pre-shared key can be assigned to the Chromebook device based on identification data received from an applicable system for facilitating network access for the Chromebook device, such as the Chromebook client management systems described in this paper.

The flowchart 700 continues to module 706, where a presence of a user in utilizing the Chromebook device is detected. An applicable engine for detecting user presence, such as the access detection engines described in this paper, can detect a presence of a user in utilizing the Chromebook device. Depending upon implementation-specific or other considerations, a user's presence in utilizing the Chromebook device can be detected when a user logs into the Chromebook device. For example, when a user inputs their login credentials, e.g. a username and password, into the Chromebook device, then the user's presence in utilizing the Chromebook device can be detected. Further depending upon implementation-specific or other considerations, a user's presence in utilizing the Chromebook device can be detected when a user establishes or attempts to establish a connection to a network using the Chromebook device. For example, a user's presence in utilizing the Chromebook device can be detected when the user establishes a connection to a network over a wired connection using the Chromebook device.

The flowchart 700 continues to module 708, where authentication data is generated from the unique pre-shared key by the Chromebook unique pre-shared key plug-in in response to detection of the presence of the user. An applicable engine for generating authentication data, such as the wireless access configuration engines described in this paper, can generate authentication data for authenticating the Chromebook device for a wireless network. Depending upon implementation-specific or other considerations, authentication data can be generated from the unique pre-shared key being installed at the Chromebook device. Further depending upon implementation-specific or other considerations, authentication data can be generated from an ONC file on the Chromebook device created and/or edited based, at least in part, on the unique pre-shared key assigned to the Chromebook device. For example, authentication data can be generated from unique pre-shared key values inserted into a pre-existing ONC file on the Chromebook device. In various implementations, authentication data for authenticating the Chromebook device can be generated based on whether a user's presence in interacting with the Chromebook device is detected. For example, authentication data can be generated when a user logs on to use the Chromebook device.

The flowchart 700 continues to module 710, where the Chromebook device is authenticated for accessing a wireless network if it is determined the authentication data was created using the unique pre-shared key in a manner agnostic to the user. An applicable engine for authenticating a client device, such as the client device authentication engines described in this paper, can authenticate the Chromebook device for accessing a wireless network. In various implementations, unique pre-shared key associated device data can be used to determine if the authentication data was created using the unique pre-shared key assigned to the Chromebook device. For example, unique pre-shared key associated device data can be queried to identify a unique pre-shared key associated with the Chromebook device, and subsequently compare the key to the authentication data to determine if the authentication data was created using het unique pre-shared key.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method, comprising:
   installing a pre-shared key plug-in on an electronic device;
   receiving, from the pre-shared key plug-in through a client management system, identification data associated with the electronic device;
   assigning a pre-shared key to the electronic device using the identification data;
   sending the pre-shared key to the electronic device;
   configuring the electronic device to authenticate for a wireless network using the pre-shared key; and
   allowing the electronic device to access the wireless network based on a status of an association between the pre-shared key and the electronic device.

2. The method of claim 1, further comprising embedding a configuration file on the electronic device to provision the electronic device with the pre-shared key for generating authentication data.

3. The method of claim 1, further comprising:
   detecting utilization of the electronic device as logging in to the electronic device; and
   in response to the utilization of the electronic device, generating an authentication data using the pre-shared key.

4. The method of claim 1, further comprising:
   detecting utilization of the electronic device as attempting, with the electronic device, to establish a connection with the wireless network; and
   in response to the utilization of the electronic device, generating authentication data using the pre-shared key.

5. The method of claim 1, further comprising in response to determining that the status of the association between the pre-shared key and the electronic device is disassociated, rejecting the electronic device to access the wireless network.

6. The method of claim 1, wherein the status of the association between the pre-shared key and the electronic device is associated.

7. The method of claim 1, wherein the identification data comprises user information of the electronic device.

8. A system, comprising:
   a plurality of memories configured to store operations;
   a plurality of processors configured to perform the operations comprising:
      installing a pre-shared key plug-in on an electronic device;
      receiving, from the pre-shared key plug-in through a client management system, identification data associated with the electronic device;
      assigning a pre-shared key to the electronic device using the identification data;
      sending the pre-shared key to the electronic device;
      configuring the electronic device to authenticate for a wireless network using the pre-shared key; and
      allowing the electronic device to access the wireless network based on a status of an association between the pre-shared key and the electronic device.

9. The system of claim 8, wherein the operations further comprise embedding a configuration file on the electronic device to provision the electronic device with the pre-shared key for generating authentication data.

10. The system of claim 8, wherein the operations further comprise:
    detecting utilization of the electronic device as logging in to the electronic device; and
    in response to the utilization of the electronic device, generating authentication data using the pre-shared key.

11. The system of claim 8, wherein the operations further comprise:
    detecting utilization of the electronic device as attempting, with the electronic device, to establish a connection with the wireless network; and
    in response to the utilization of the electronic device, generating authentication data using the pre-shared key.

12. The system of claim 8, wherein the operations further comprise in response to determining that the status of the association between the pre-shared key and the electronic device is disassociated, rejecting the electronic device to access the wireless network.

13. The system of claim 8, wherein the status of the association of the pre-shared key and the electronic device is associated.

14. The system of claim 8, wherein the identification data comprises user information of the electronic device.

15. A non-transitory, tangible computer-readable device having instructions stored thereon that, when executed by at least one computing device, causes the at least one computing device to perform operations comprising:
    installing a pre-shared key plug-in on a user equipment (UE) device;
    receiving, from the pre-shared key plug-in, identification data associated with the UE device;
    assigning a pre-shared key to send to the UE device;
    based on the identification data, associating the pre-shared key to the UE device;

configuring the UE device to authenticate for a wireless network using the pre-shared key; and allowing the UE device to access the wireless network based on a status of an association between the pre-shared key and the UE device, wherein the identification data comprises user information of the UE device.

16. The non-transitory, tangible computer-readable device of claim 15, wherein the operations further comprise embedding a configuration file on the UE device to provision the UE device with the pre-shared key for generating authentication data.

17. The non-transitory, tangible computer-readable device of claim 15, wherein the operations further comprise:
detecting utilization of the UE device as logging in to the UE device; and
in response to the utilization of the UE device, generating authentication data using the pre-shared key.

18. The non-transitory, tangible computer-readable device of claim 15, wherein the operations further comprise:
detecting utilization of the UE device as attempting, with the UE device, to establish a connection with the wireless network; and
in response to the utilization of the UE device, generating authentication data using the pre-shared key.

19. The non-transitory, tangible computer-readable device of claim 15, wherein the operations further comprise in response to determining that the status of the association between the pre-shared and the UE device is disassociated, rejecting the UE device to access the wireless network.

20. The non-transitory, tangible computer-readable device of claim 15, wherein the status of the association between the pre-shared key and the UE device is associated.

* * * * *